Patented Oct. 3, 1950

2,524,414

UNITED STATES PATENT OFFICE 2,524,414

CHROMATOGRAPHIC SEPARATION OF CARBOHYDRATES

Melville L. Wolfrom, Columbus, Ohio, and Baak W. Lew, Wilmington, Del., assignors to Ohio State University Research Foundation, Columbus, Ohio, a corporation of Ohio No Drawing. Application June 26, 1946, Serial No. 679,495

24 Claims. (Cl. 127—55)

The invention described and claimed in this application relates to methods for separating and for analyzing water-soluble polyfunctional materials, such as the carbohydrates and related substances, from one another by selective adsorption.

One of the objects of this invention is a new and improved method of separating water-soluble polyfunctional materials for one another.

A further object of the invention is an improvement in the process of chromatography especially as applied to carbohydrates and related substances.

A further object of the invention is the provision of a new and improved method of eluting substances separated by chromatographic methods.

Further objects and features of the invention will be apparent from consideration of the following description and claims.

Selective adsorption separation of materials, on a fixed body of adsorbent, is often called chromatography, because the first successful application of the method was achieved with colored leaf pigments, by Tswett. The method makes use of the differences in adsorption affinity of adsorbates for a given adsorbent, from solution in the same solvent. The adsorbent, usually in powdered form, is packed in a column. A mixture of adsorbates is then deposited on the top or inlet end of the column, the mixture usually being in a relatively concentrated solution. The separation or chromatogram is then developed by passing through the column a solvent known as the developer. The developer will be found to proceed down or along the column of adsorbent as an advancing front generally perpendicular to the direction of flow. Under the dissolving influence of the developer, each adsorbate begins to move down or along the column as an adsorption zone, or band, having a relatively sharp advancing boundary, and a relatively diffuse retreating boundary. Adsorbates having different adsorption affinities move at different rates, so that, when sufficient developer has been passed through the adsorbent body, the different adsorbates are spread out on the column in a series of separate zones, arranged in descending order of their adsorption affinities for the adsorbent used.

This behavior of adsorbates when chromatographed is conveniently described in terms of the relative rate, which is the ratio of the rate of movement of the adsorption zone to the rate of movement, or flow, of the developer down the column.

Thus if sufficient developer is employed that its advancing front proceeds through the column length of the adsorbent, and an adsorbent zone moves half way down the column, the relative rate is 0.5, and the solvent power or strength of the developer effectively balances the adsorptive strength of the adsorbent. If the solvent power of the developer is weakened, the relative rate is decreased, and if the solvent power is decreased sufficiently, the adsorption zone ceases to move and the relative rate becomes zero. Conversely, if the solvent power of the developer is strengthened until the adsorption zone moves at the same rate as the developer, or is freely falling, the relative rate is one.

If the flow of developer is continued long enough beyond one column length, different zones of separated adsorbate can be moved successively completely off the column, and collected individually for recovery. This technique is called flowing chromatography. Another method for recovery of fractions separated on the adsorbate involves extruding or otherwise removing the adsorbent column or body intact from its container, sectioning the column at the interzones, and eluting the adsorbate fractions from the separate sections of the columns.

The separated zones can also be eluted separately from the column without extruding, by use of suitable apparatus. The main invention disclosed herein is not limited to any particular way of removing the separated adsorbates from the adsorbent.

In some cases we have used and in certain circumstances and under certain conditions we prefer to use a method of elution which we perform as follows: After the column has been extruded and sectioned into zones, the moist adsorbate containing each component is separated. For example, they may be packed into separate chromatographic tubes. The separated components may then be eluted with a sufficient volume of a solvent, preferably, commensurate in strength with the developer employed so that the adsorbed component is entirely developed off the column. The eluate may then be treated further to remove any liquefied or other adsorbent which may have been eluted along with the carbohydrates, although in many cases with our improved method such further treatment may not be necessary. Usually about five column lengths of a solvent composed of the constituents of the initial developer but containing about 15% more water are sufficient to elute an adsorbed component entirely off of the column.

With colored adsorbates, the position of the zones on colorless or lightly colored adsorbents can be determined visually. With colorless adsorbates, indirect methods must be used. Ultraviolet light has been employed for fluorescing compounds or the process of following the refractive indices of the solution as it filters through in flowing chromatography may be used. Other methods make use of chemical color tests, and this requires application of a color-producing reagent, usually by extruding the column, and streaking with a reagent. The reagent used varies with the adsorbate. For readily oxidized compounds, such as the compounds with which this application is largely concerned, alkaline permanganate (for example, a solution of one part sodium hydroxide, $\frac{1}{10}$ part of potassium permanganate in 10 parts of water) is effective. Inasmuch as the above solution turns from green to tan in the presence of oxidizable material, streaking with it clearly indicates the zones. Acidic compounds may be detected by acid-base indicators, such as Congo red. The present invention is not limited to any particular method of identifying the separated adsorbate zones on the column or adsorbent body or in the filtrate solution.

The resolution of carbohydrate mixtures by chromatographic means has hitherto been carried out either by forming a colored derivative, such as the fully acylated phenyl azobenzoates (G. D. Coleman and co-workers, Journal American Chemical Society 64, 1501; 65, 1588; 67, 381–6) or by acetylating and identifying the zones by permanganate streaking; e. g. Wolfrom and co-workers, J. Am. Chem. Soc. 67, 527. In both cases, strongly lipophile solvents were used. Methylated sugars of higher and lower degrees of methylation have likewise been separated on the column, using petroleum ether as the developer, and silica as the adsorbent.

We have now discovered that carbohydrates and related polyfunctional compounds may be chromatographically separated directly as such, using developers having both hydrophile and lipophile character, such as the lower aliphatic alcohols and their aqueous solutions.

The separation process of the invention is, in general, applicable to mixtures containing one or more colorless, water-soluble polyfunctional compounds having at least one hydroxyl group, and having in addition thereto at least one other of the functional groups, hydroxyl, amine, carboxyl or carbonyl. The process of the present invention is particularly applicable to the water-soluble carbohydrates and the related products, the polyhydric alchols, polyhydric alcohol anhydrides, and hydroxy acids.

Many different adsorbents of either natural or synthetic type may be used in the process of the invention. In general it is preferred to use light colored adsorbents when it is necessary to determine the presence of adsorption bands by reference to color tests. Exemplary of adsorbents which may be used are, silica gel, activated alumina, and activated magnesium silicate. Activated clay, which is a mixture of activated sodium potassium aluminum silicates, is a highly discriminating adsorbent, and its use is often preferred for the closer separations.

It is usually desirable that the adsorbent be finely divided and packed to a uniform density. If there is difficulty in obtaining a ready passage of developer through the adsorbent, increased flow rate may often be obtained if filter aid material such as diatomaceous earth is mixed with the adsorbent. When activated clay adsorbent is employed, ratios of clay to filter aid as high as 5 to 1 have been employed successfully, and even higher ratios may be used at the sacrifice of filtering speed. Ratios as low as 2 to 1 have also been successfully employed, but ratios much lower than this may sometimes result in undue decrease in the capacity of the column caused by dilution of the adsorbent.

If the adsorbent material contains developer-soluble impurities, as is often true of such materials as activated clay, it is desirable that these impurities be removed by solvent extraction prior to use of the adsorbent.

It has been mentioned that the developers to be used according to the present invention should have both hydrophile and lipophile character. Hydrophile character may be contributed by hydroxyl, amine, or carboxyl groups or by hydrogen ion. Lipophile character can be contributed by many non-functional organic residues which are non-reactive with hydrophile groups employed and are otherwise stable under conditions of developer use. Such groups, for example, as alkyl, alkylidine, aryl, and alkoxy groups may be mentioned as groups contributing lipophile character. Usually the larger the group the more it contributes to lipophile character. For example, the isopropyl group, being longer than the methyl and ethyl groups may be considered more lipophile than these groups. The desired hydrophile-lipophile balance of the developer can be obtained by the use of single compounds having in themselves adequate balance or by mixtures of compounds. It is important, however, that where a mixture is used, the individual compounds which make up a developer contain no more than one hydrophile group and be mutually miscible with the other component or components in the developer.

The cheap lower alcohols propyl, isopropyl, methyl, and ethyl alcohols are preferred developer materials. Each of these substances may be mixed with any of the others or with water to alter its lipophile-hydrophile balance. Water is usually too strong a developer for use by itself in developing the adsorbates here under consideration, and its use is confined to combinations with more lipophile compounds. Other compounds which are suitable for use as developer constituents are the four butyl alcohols, acetone, methyl ethyl ketone, diacetone alcohol, dioxane, ethylene glycol, dimethyl ether, Cellosolve, methyl Cellosolve, butyl Cellosolve, pyridine, triethylamine. glacial acetic acid, hydroch'oric acid, benzene, hexane, and cyclohexane. Some of these last-mentioned compounds, such as methyl Cellosolve or pyridine, have hydrophile-lipophile balances such that they may be used alone or as developers for some materials. Others, such as benzene, are too weak for use by themselves but can be sometimes used to impart lipophile character to a mixed developer.

The limitations in the amount and strength of developer for the different classes are to be taken only as guides and considerable latitude is allowable in the choice of volume and strength of developer. However, it should be noted that there is an optimum strength for the developer with which resolution is best and variations of too great a degree (say more than 3 or 4%) and especially on the stronger developing side will hinder the separation if not entirely prevent it. The closer the components are in the series, the stricter the conditions become. Components which are widely separated have a wider critical range within which we may change the strength and volume of the developer. In cases where the different components appear from the above instructions to require different developers, the developer for the most weakly adsorbed component (lowest in the adsorption series) should be used.

In other words, developer strength is not so critical when adsorbates having widely differing adsorption affinities are employed, but when the materials have closely adjacent adsorption affinities developer strength should be more closely adjusted. Developers used may sometimes be so weak that their relative rate with a faster adsorbate is as low as 0.01, or they may at times be so strong that their relative rates with a slower adsorbate is as high as 0.8. Usually, however, when materials to be separated have relative rate which are close to one another it is desirable for practical separations that the developer have a hydrophile-lipophile balance such as to give a relative rate of from about 0.1 to about 0.5 with at least one of the adsorbates. It will generally be found that developers weaker than isopropyl alcohol or stronger than a binary mixture of isopropyl alcohol and water containing more than about 35% water will not be used in the process of the invention. The optimum developer strength for a given separation is not necessarily the same when different adsorbents are used.

Materials to which the separation process of the invention is applicable may be arranged in a chromatographic adsorption series, in the order of their adsorption affinities for a particular adsorbent (or relative rates), i. e., with the members having the highest adsorption affinities first and with those having lower adsorption affinities later in the series. Such an arrangement is given in the second column of the table below for a number of polyfunctional adsorbates on an activated clay adsorbent (adsorbent mixed with filter aid in a ratio of 5 to 1). In the arrangement of materials it will be noted some compounds have adsorption affinities (and hence relative rates) of the same order. Such materials are grouped together in classes which are numbered in the first column of the table. As among different classes the relative rate differences with the developers employed are sufficient for adequate separation. Materials in the same class, however, are not usually practically resolvable for most purposes.

In the preparation of the tabulated chromatographic or adsorption series, a cylindrical adsorbent column 0.9 centimeter in diameter and 6 centimeters long containing 1.68 grams of the adsorbent mixture was employed. One milligram of each of the adsorbates was dissolved in 0.5 cubic centimeter of developer, and this solution was poured into the top of the column. Definite quantities of developer were then passed through the column. The amounts and kinds of developer employed in making the individual adsorbates are listed in column 3 of the table.

To demonstrate the interchangeability of developer compositions, providing an adequate hydrophile-lipophile balance is maintained, it has been determined that binary mixtures of isopropyl alcohol and water alone are adequate to separate the members of the series. For this purpose the following mixtures will be adequate: 70 cc. of isopropyl alcohol and 30 cc. of water will be applicable to the classes 1–6 inclusive, of the table; a mixture of 90 cc. of isopropyl alcohol and 10 cc. of water will be applicable to the classes 7–29, inclusive; and a mixture of 97 cc. of isoprpyl alcohol and 3 cc. of water will be satisfactory for the classes 30–43, inclusive.

As stated in the third paragraph above, usually when the materials to be separated have relative rates which are close to one another, it is desirable for practical separation that the developer give a re'ative rate of 0.1 to 0.5 with at least one of the adsorbates. The three isopropyl alcohol and water mixtures set out in the last paragraph above are as stated "adequate." They give such rates in all cases and thus will move each class of materials in the group to which the mixture is applicable at a relative rate between 0.1 and about 0.5. It is, of course, to be understood also that the amounts of developers specified in the paragraphs above are for the purpose of indicating proportions. Rarely would the whole 100 cc. of isopropyl alcohol-water mixture be necessary for developing a chromatogram on a column of the size under consideration, the amount of developer required being dependent both on the relative rate and the size of the column. Column 3 of the table following gives the ethyl alcohol-water mixtures and isopropyl alcohol-water mixtures giving relative rates as 0.1 to 0.5 with the classes shown, and are alcohol-water mixtures actually used in mapping the classes (i. e. determining the relative position on the column). As stated, the isopropyl alcohol-water mixtures set out in the paragraph above will work for all classes. This does not make the two developers of equal strength. The same compounds may be separated by developers of different strength by using more of the weaker developer. The developers specified in the last paragraph are not necessarily in each case optimum for each class. It has been found, however, that isopropyl alcohol and water mixtures will cover the entire range of classes if the relative proportions are varied as specified.

Table.—Chromatographic adsorption series of Carbohydrates and related polyfunctional compounds

| Column 1 Class # | Column 2 Adsorbate | Column 3 Mapping Developer |
| --- | --- | --- |
| 1 | potassium acid D-glucosaccharate, D-glucosamine hydrochloride, D-chondrosamine hydrochloride. | 10 cc. of 70% Ethyl alcohol. |
| 2 | (dextro)-tartaric acid. | Do. |
| 3 | D-gluconic acid, aminonium D-gluconate, sodium D-gluconate. | Do. |
| 4 | D-arabonic acid, L-arabonic acid, potassium D-arabonate, citric acid. | Do. |
| 5 | D-mannonic acid. | Do. |
| 6 | α-D-galacturonic acid. | Do. |
| 7 | lactitol, melibiitol, (melting point 225°). | Do. |
| 8 | L-iditol, meso-inositol, stachyose, Schardinger, α-dextrin. | 10 cc. of 90% Ethyl alcohol. |
| 9 | lactose. | Do. |
| 10 | sorbitol, dulcitol, sodium lactate, L-perseulose, D-perseulose, Schardinger β-dextrin, (levo)-malic acid. | Do. |
| 11 | raffinose. | Do. |

Table.—*Chromatographic adsorption series of Carbohydrates and related polyfunctional compounds*—Continued

| Column 1 Class # | Column 2 Adsorbate | Column 3 Mapping Developer |
|---|---|---|
| 12 | xylitol | 10 cc. of 90% Ethyl alcohol. |
| 13 | D-mannitol, D-talitol, gentiobiose | Do. |
| 14 | D-glucose | 5 cc. of 90% Ethyl alcohol. |
| 15 | melibiose, D-mannose, D-ribose, 3,6-anhydro-D-glucitol, D-psicose | Do. |
| 16 | cellobiose | Do. |
| 17 | 1-desoxy-D-glucitol | Do. |
| 18 | ascorbic acid | Do. |
| 19 | D-arabitol | Do. |
| 20 | allitol | Do. |
| 21 | maltose, D-galactose, D-fructose, melezitose, D-mannoheptulose, trehalose, D-gluco-D-gulo-heptose (D-α-glucoheptose). | 4 cc. of 95% Ethyl alcohol. |
| 22 | L-fucitol, turanose, 1,5 anhydro-D-mannitol, 1,4 anhydro-D-mannitol, α-D-lyxose. | Do. |
| 23 | D-rhamitol, L-rhamitol, γ-desoxy-D-glucitol, D-glucoheptulose | Do. |
| 24 | L-arabinose, D-arabinose, adonitol, quercitol, diethylene glycol, dipentaerythritol | Do. |
| 25 | sucrose, erythritol, L-altrose | Do. |
| 26 | D-glucuronic acid γ-lactone | Do. |
| 27 | L-sorbose, succinic acid | Do. |
| 28 | anhydroenneaheptitol | Do. |
| 29 | D-glucose, glycerol | 5 cc. of 90% Isopropyl alcohol. |
| 30 | L-allose | Do. |
| 31 | 1,4:3,6-dianhydro-D-mannitol, amygdalin | Do. |
| 32 | α-D-galacto-meta-saccharinic acid | Do. |
| 33 | (propylene glycol) β-D-glucoside | Do. |
| 34 | L-fucose | 6 cc. of 97% Isopropyl alcohol. |
| 35 | methyl α-D-glucoside, methyl β-D-glucoside | Do. |
| 36 | methyl α-D-mannoside, D-xylose, D-glucono-α-lactone | Do. |
| 37 | 1,4 anhydro-D-glucitol, dipropylene glycol, pentaerythritol, 1,5:3,6 dianhydro-D-mannitol, 1,4:3,6 dianhydro-D-glucitol. | Do. |
| 38 | D-glucono-γ-lactone | 4 cc. of 97% Isopropyl alcohol. |
| 39 | L-rhamnose, salicin | Do. |
| 40 | ethylene glycol | Do. |
| 41 | propylene glycol | Do. |
| 42 | phloridzin | Do. |
| 43 | 1,4:3,6-dianhydro-L-iditol | Do. |

In general the method which we followed in preparing or "mapping the chromatographic adsorption series" table above included the following steps:

(1) Preparing a suitable adsorbent and packing it into the chromatographic tube; (2) dissolving the material to be separated in a suitable solvent; (3) pouring the solution onto the column of adsorbent in the chromatographic tube; (4) developing the chromatogram by pouring on and into the tube a suitable quantity of a suitable concentration of the selected developer; (5) expressing the developed chromatographic column from the tube; (6) zoning the column by marking it by a suitable streak agent.

The adsorbents referred to above as having been used in the illustration of the process of this invention will usually adsorb up to about 0.5% of their weight of adsorbate. The ratio of adsorbate to adsorbent, and the proportions of the adsorbent body or column will depend to a considerable extent not only on the nature of the adsorbent but also on the nature of the adsorbates, and on the mode of operation of the column. If it is desired to fix a number of closely spaced adsorbates on the column for visual chromatogramming, and/or separation by sectioning and elution, a relatively long column, and a correspondingly high ratio of adsorbent to adsorbate will be needed. If, on the other hand, it is required to separate a comparatively large amount of fast-moving or freely-falling adsorbate (e. g. relative rate of one) from a smaller, strongly held fraction, by a flowing method, wherein only the smaller fraction need be held, a proportionately smaller adsorbent body can be used.

Other methods of utilizing the separation process of the invention will be readily apparent to those skilled in the art. For example, where a weak developer is used, it may be recycled repeatedly through the column in the interest of economy if all components of the mixture to be separated are held on the column and removed from the developer.

For the separation of known mixtures, it is convenient to select a developer of proper strength by pilot experimentation on readily extrudable columns, and then, having established the relative rate of the adsorbates, to apply this information to the operation, by flowing methods, of larger columns not well adapted to extrusion or other means of visual control of the separation process. However, visual control may be achieved by other methods such as the use of colored reference or pilot adsorbates. Such pilot adsorbates may have relative rates between those of the adsorbates whose separation is desired, and thus indicate an interzone—or they may be in the same class as the desired adsorbate, and recovered therewith. In the latter case, a subsequent separation of the indicator from the adsorbate, by chemical or physical means—such as use of a different adsorbent, is usually necessary.

The separated adsorbates may be recovered from solution in the developer or eluent by any convenient means, such as evaporation and/or crystallization.

Examples illustrative of the above described methods have been performed by us as follows: In these examples all melting points are corrected values and the adsorbent used in each case comprises a mixture of five parts of a domestic commercial fuller's earth type clay sold by the Floridin Company of Warren, Pennsylvania, and one part of a diatomaceous silica or earth manufactured by Johns-Manville Company, the ratio of five to one being by weight.

*Example I.—Mannitol and dulcitol*

A mixture containing 100 mg. each of D-mannitol and dulcitol in 25 cc. of 95% ethyl alcohol was placed on a 3.3 x 30 cm. column and developed with 350 cc. of 90% ethyl alcohol. The time required was two hours and fifteen minutes. The two zones, about 1.5 cm. apart, were each eluted four times with 150 cc. of water each time. The combined centrifuged eluates from each zone were concentrated to a small volume and alcohol added to the point of crystallization. The first crop of D-mannitol gave a recovery of 90% with melting point 166–167°; a second crop gave a further .6% with the same melting point. The literature value for the melting point of D-mannitol is 166°. The first crop of dulcitol gave 95% recovery with melting point 187–188°. The literature value for the melting point of dulcitol is 188°.

*Example II.—Sucrose and raffinose*

A mixture containing 1.5 g. of sucrose and 0.5 g. of raffinose pentahydrate in 100 cc. of 95% ethyl alcohol was placed on a 3.3 x 6.7 cm. column and developed with 100 cc. of 95% ethyl alcohol. The time required was thirty minutes. This amount of developer removed the sucrose entirely off the column, and the solution thereof was collected in the receiver. The first 15 cc. of filtrate was discarded. The remaining filtrate was concentrated and ethyl alcohol was added to effect crystallization. The first crop of sucrose gave a recovery of 95% and a second crop of further 2.1%. Both crops had a melting point of 188–189°. The accepted value for the melting point of sucrose is 188°. The column was extruded and the extruded column was streaked with alkaline permanganate and the raffinose zone was eluted with water four times. The eluate on concentration and crystallization with ethyl alcohol gave a recovery of 87% of raffinose of melting point 122° (accepted value M. P. 123°) on the first crop and a further 8% on the second crop.

*Example III.—Separation of a small amount of dipentaerythritol from a large amount of pentaerythritol*

An amount of 2.0 g. of crude pentaerythritol (melting point 184–237°) containing a small amount of dipentaerythritol was dissolved in 8 cc. of hot water and 152 cc. of 99% isopropyl alcohol added to this solution. The resultant solution was then placed on a 5.1 x 11.6 cm. column and developed with 1000 cc. of 97% isopropyl alcohol. This amount of developer developed the pentaerythritol zone off the column in three hours and the filtrate was collected after discarding the first 50 cc. The filtrate was then concentrated to give a first crop of 1.26 g. of crystalline pentaerythritol with a melting point of 265–266°. A second crop gave 0.36 g. with a melting point of 259–260°. A third crop gave 0.09 g., melting point 259–260°. The literature value for the melting point of pentaerythritol is 263°. The extruded column was streaked with alkaline permanganate and the moist zone containing the dipentaerythrityl ether (dipentaerythritol) was repacked into another chromatographic tube and the dipentaerythrityl ether developed off the column with 500 cc. of 80% ethanol. The filtrate on concentration gave a first crop of crystals weighing 190 mg. with a melting point of 220–221°. A second crop gave 45 mg. with a melting point of 219–220°. Total dipentaerythrityl ether content, 12%. The literature value for the melting point of dipentaerythrityl ether is 221°.

*Example IV.—Chromatography of a five component mixture, α-D-galacturonic acid, D-galactose, D-glucose, D-xylose and L-rhamnose*

A mixture containing about 0.2 mg. of each of these compounds in 0.5 cc. of 95% isopropyl alcohol was chromatographed on a 0.9 x 9.5 cm. column and developed with 7 cc. of 94% isopropyl alcohol. The streaked column showed that the five components had been resolved into five separate zones, as follows: measured in cm. from the top of the column: α-D-galacturonic acid, 0. cm. to 0.3 cm.; interzone, 0.3 cm. to 0.7 cm.; D-galactose, 0.7 cm. to 1.4 cm.; interzone, 1.4 cm. to 2.0 cm.; D-glucose, 2.0 cm. to 2.8 cm.; interzone, 2.8 cm. to 3.7 cm.; D-xylose, 3.7 cm. to 4.9 cm.; interzone, 4.4 cm. to 6.0 cm.; L-rhamnose, 6.0 cm. to 7.5 cm.

It is to be understood that the above described embodiment of our invention is for the purpose of illustration only and various changes may be made therein without departing from the spirit and scope of our invention.

We claim:

1. A method for the separation of water-soluble colorless compounds selected from a group consisting of the water soluble carbohydrates, the polyhydric alcohols, the polyhydric alcohol anhydrides, and the hydroxy acids, said compounds having different adsorption affinities for a solid adsorbent, selected from the group consisting of silica gel, activated alumina, activated clay and alkaline earth silicates which comprises dissolving said materials in a solvent which has both hydrophile and lipophile character and has sufficient hydrophile character that said polyfunctional materials are dissolved and sufficient lipophile character that the materials are at the time retained on the column; developing said solution on said adsorbent with a developer of both hydrophile and lipophile character, said developer having sufficient hydrophile character that said colorless materials proceed through said adsorbent at different rates.

2. A method for the separation of water-soluble colorless compounds selected from a group consisting of water soluble carbohydrates, the polyhydric alcohols, the polyhydric alcohol anhydrides, and the hydroxy acids, said compounds having different adsorption affinities for activated clay, which comprises dissolving said materials in a solvent which has both hydrophile and lipophile character and has sufficient hydrophile character that said colorless materials are dissolved and sufficient lipophile character that the materials are at the time retained on the column; pouring the solution on said clay; and developing with a developer of both hydrophile and lipophile character, said developer having sufficient hydrophile character that said polyfunctional materials proceed through said clay at different rates.

3. A method according to claim 2 in which at least one of the colorless compounds to be separated is a carbohydrate.

4. A method according to claim 2 in which at least one of the colorless compounds to be separated is a polyhydroxy compound containing no oxygen except in the form of ether oxygen and hydroxyl oxygen.

5. A method according to claim 2 in which at least one of the colorelss compounds to be separated is a polyhydric alcohol.

6. A method according to claim 2 in which the developer includes a monohydric alcohol containing not more than three carbon atoms.

7. A method of separating selected carbohydrates from a mixture thereof which comprises the steps of dissolving the mixture of carbohydrates in a solvent which has both hydrophile and lipophile character and has sufficient hydrophile character that the materials go into solution and sufficient lipophile character that the materials are at the time retained upon the column; pouring the solution onto a column of an adsorbing medium; pouring a developer onto the adsorbing medium consisting of an adsorbent selected from the group consisting of silica gel, activated alumina, activated clay and alkaline earth silicates to separate layers of separated carbohydrates separating a portion of the column containing a layer of separated carbohydrates; and eluting the separated carbohydrate from the separated portion separately by use of a water soluble, organic, polar solvent.

8. A method of separating carbohydrates from a mixture thereof which comprises the steps of dissolving the mixture of carbohydrates in a solvent which has both hydrophile and lipophile character and has sufficient hydrophile character that the materials go into solution and sufficient lipophile character that the materials are at the time retained on the column; pouring the solution onto a column of an adsorbing medium consisting of an adsorbent selected from the group consisting of silica gel, activated alumina, activated clay and alkaline earth clay; pouring a developer onto the adsorbing medium to separate layers of separated carbohydrates; separating the portions of the column containing each layer of separated carbohydrates; and eluting the separated carbohydrates from each of the separated portions separately by use of a solvent substantially commensurate in strength with the original developer.

9. A method of separating carbohydrates from a mixture thereof which comprises the steps of dissolving the mixture of carbohydrates in a solvent which has both hydrophile and lipophile character and has sufficient hydrophile character that the carbohydrates are dissolved and sufficient lipophile character that the materials are at the time retained upon the column; pouring the solution onto a column of an adsorbing medium consisting of an adsorbent selected from the group consisting of silica gel, activated alumina, activated clay and alkaline earth silicates placed within a container; pouring a developer onto the adsorbing medium to separate layers of separated carbohydrates; extruding the column from the container; separating a portion of the column containing a layer of a separated carbohydrate; and eluting the separated carbohydrate from the separated portion separately in an adsorbing column by the use of a solvent having both hydrophile and lipophile character substantially commensurate in strength with the original developer.

10. A method of separating carbohydrates from a mixture thereof which comprises the steps of dissolving the mixture of carbohydrates in a solvent having both hydrophile and lipophile character which has sufficient hydrophile character that the carbohydrates are dissolved and sufficient lipophile character that the materials are at the time retained upon the column; pouring the solution onto a column of an adsorbing medium consisting of an adsorbent selected from the group consisting of silica gel, activated alumina, activated clay and alkaline earth silicates placed within a container; pouring a developer onto the adsorbing medium to separate layers of separated carbohydrates; extruding the column from the container; separating a portion of the column containing a layer of a separated carbohydrate; repacking the separated sections of adsorbent into containers; and eluting the adsorbent therefrom with a solvent which has both hydrophile and lipophile character commensurate in strength with the original developer.

11. A method of separating carbohydrates from a mixture thereof which comprises the steps of dissolving the mixture of carbohydrates in a solvent which has both hydrophile and lipophile character and has sufficient hydrophile character that said colorless materials are dissolved and sufficient lipophile character that the materials are at the time retained upon the column; pouring the solution onto a column of an adsorbing medium consisting of an adsorbent selected from the group consisting of silica gel, activated alumina, activated clay, and alkaline earth silicates; pouring a developer onto the adsorbing medium to separate layers of separated carbohydrates; separating the portions of the column containing each layer of separated carbohydrates; and eluting the separated carbohydrates.

12. A method of separating individual components from a mixture of a plurality of water-soluble colorless compounds selected from the group consisting of the water soluble carbohydrates, the polyhydric alcohols, the polyhydric alcohol anhydrides, and the hydroxy acids which comprise the steps of dissolving the mixture in a solvent which has both hydrophile and lipophile character and has sufficient hydrophile character that the materials are dissolved and sufficient lipophile character that the materials will be for the time retained upon the column; pouring the solution onto a column of an adsorbing medium consisting of an adsorbent selected from the group consisting of silica gel, activated alumina, and alkaline earth silicates; and pouring a developer onto the adsorbing medium to cause separated layers of compounds to form.

13. A method for the separation of water-soluble compounds selected from the group consisting of the water soluble carbohydrates, the polyhydric alcohols, the polyhydric alcohol anhydrides and the hydroxy acids, said compounds having different adsorption affinities for activated clay adsorbent, which comprises dissolving said materials in a solvent which has both a hydrophile and a lipophile character and has sufficient hydrophile character that the materials will be dissolved and sufficient lipophile character that the materials will be for the time retained upon said adsorbent; pouring said solution on to said clay; and developing said solution on said clay with a developer of both hydrophile and lipophile character, said developer having sufficient hydrophile character that said polyfunctional materials proceed through said clay at different rates.

14. A method for the separation of water-soluble compounds selected from the group consisting of the water soluble carbohydrates, the polyhydric alcohols, the polyhydric alcohol anhydrides and the hydroxy acids, said compounds having different adsorption affinities for activated clay adsorbent, which comprises dissolving said materials in a solvent which has both hydrophile and lipophile character and has sufficient hydrophile character that said materials will be dissolved and sufficient lipophile character that said materials will be for the time retained upon the clay; pouring the solution on to said clay; and developing said solution on said clay with a developer of both hydrophile and lipophile character, said developer having sufficient hydrophile character that said polyfunctional materials proceed through said clay at different rates.

15. A method for the separation of water soluble colorless materials selected from the group consisting of the water soluble carbohydrates, the polyhydric alcohols, the polyhydric alcohol anhydrides and the hydroxy acids, said compounds having different adsorption affinities for a solid adsorbent; which comprises dissolving said materials in a solvent which has a hydrophile and lipophile character and has sufficient hydrophile character that said materials are dissolved and sufficient lipophile character that said materials will be for the time retained on the column; placing said solution on a chromatographic column having a fuller's earth type clay adsorbent; developing a chromatogram by passing through said column a developer consisting of a mixture of an alcohol and water which has a mixed hydrophile and lipophile character and has sufficient hydrophile character that said water soluble materials proceed through said adsorbent at different rates; and eluting said separated materials.

16. A method for the separation of water soluble materials selected from the group consisting of the water soluble carbohydrates, the polyhydric alcohols, the polyalcohol anhydrides and the hydroxy acids, said products having different adsorption affinities for a solid activated clay adsorbent; which comprises dissolving said materials in a solvent which has both hydrophile and lipophile character and has sufficient hydrophile character that said materials are dissolved and sufficient lipophile character that said materials will be for the time retained on the column; placing the said solution on a chromatographic column formed of said adsorbent and developing a chromatogram by passing through said column a developer which has a mixed hydrophile and lipophile character and has sufficient hydrophile character that said water soluble materials proceed through said adsorbent at different rates, said developer consisting of a mixture of an alcohol and water; and eluting said materials separately.

17. A method for the separation of a carbohydrate from other water soluble colorless carbohydrate compounds with which it is in solution which comprises placing said solution on a fuller's earth type native activated clay chromatographic column, developing a chromatogram on said column by the use of a developer consisting of a mixture of water and a monohydric alcohol containing not more than three carbon atoms which developer has both hydrophile and lipophile character and has sufficient hydrophile character that said carbohydrate materials proceed through said column and sufficient lipophile character that the materials proceed at different rates, and eluting said materials separately.

18. A method for the separation of a carbohydrate from other water soluble colorless carbohydrate compounds with which it is in solution which comprises placing said solution on a chromatographic column having an adsorbent selected from the group consisting of silica gel, activated alumina, activated clay, and activated alkaline earth silicates, developing a chromatogram on said column by the use of a developer which has both hydrophile and lipophile character and has sufficient hydrophile character that said polyfunctional materials proceed through said column and sufficient lipophile character that the materials proceed at different rates and eluting said materials separately.

19. A method of separating selected carbohydrates from a mixture thereof which comprises the steps of dissolving the mixture of carbohydrates in a solvent which has both a hydrophile and a lipophile character and has a sufficient hydrophile character that the carbohydrates will be dissolved and a sufficient lipophile character that said solution will be for the time retained on the column; pouring the solution onto a chromatographic column having a fuler's earth type native activated clay adsorbent; pouring a developer which has both hydrophile and lipophile character and has sufficient hydrophile character that said carbohydrate solution proceeds through said column and sufficient lipophile character that the materials proceed at a different rate; separating a portion of the column containing a layer of selected separated carbohydrates; and diluting the selected separated carbohydrates from the separated portions separately by the use of a solvent therefor.

20. A method for the separation of a carbohydrate from other water soluble colorless carbohydrate compounds with which it is in solution which comprises placing said solution on a fuller's earth type native activated clay chromatographic column; developing a chromatogram on said column by the use of a developer consisting of a mixture of 5% of water and 95% of a monohydric alcohol containing not more than three carbon atoms which developer has both hydrophile and lipophile character and has sufficient hydrophile character that said polyfunctional materials proceed through said column and sufficient lipophile character that the materials proceed at different rates; and eluting the materials separately.

21. A method of separating selected carbohydrates from a mixture thereof which comprises the steps of dissolving the mixture of carbohydrates in a mixture of approximately 5% water and approximately 95% alcohol, pouring the solution onto chromatographic column having a fuller's earth type native activated clay adsorbent; pouring a developer consisting of a mixture of from 5% to 10% of water and from 95% to 90% ethyl alcohol; streaking to determine the layers of separated carbohydrates by separating a portion of the column containing a layer of the selected separated carbohydrates; and eluting the selected separated carbohydrates from the separated portions separately by the use of a solvent therefor.

22. A method for the separation of individual components from a mixture of a plurality of water-soluble colorless carbohydrate compounds comprising the steps of dissolving the mixture in an aqueous alcoholic solvent selected from the group consisting of aqueous methyl, ethyl, normal propyl and isopropyl alcohols; pouring the solution onto a column of an adsorbing medium selected from the group consisting of silica gel, activated alumina, activated magnesium silicate, and activated clay; and pouring an aqueous alcoholic developer selected from the group consisting of aqueous methyl, ethyl, normal propyl, and isopropyl alcohols onto the adsorbing medium to separate the components.

23. A method for the separation of water soluble colorless compounds selected from a group consisting of the water soluble carbohydrates, the polyhydric alcohol anhydrides, and the hydroxy acids, said compounds having different adsorption affinities for a solid adsorbent selected from the group consisting of silica gel activated alumina, activated clay and alkaline earth silicates which comprises pouring a liquid phase of a mixture of said materials on said adsorbent; and pouring a developer having both a hydrophile and lipophile character on said adsorbent to form separated layers of said materials, said developer having sufficient hydrophile character that said colorless materials proceed through said adsorbent at different rates.

24. A method of separating selected carbohydrates from a mixture thereof which comprises the steps of dissolving the mixture of carbohydrates in a mixture of approximately 5% water and approximately 95% alcohol, pouring the solution onto a chromatograph column having a fuller's earth type native activated clay adsorbent; pouring a developer consisting of a mixture of from 5% to 10% of water and from 95% to 90% of isopropyl alcohol; streaking to determine the layers of separated carbohydrates by separating a portion of the column containing a layer of the selected separated carbohydrates; and eluting the separated carbohydrates from the separated portions separately by the use of a solvent therefor.

MELVILLE L. WOLFROM.
BAAK W. LEW.

REFERENCES CITED

The following references are of record in the file of this patent:

UNITED STATES PATENTS

| Number | Name | Date |
| --- | --- | --- |
| 1,170,868 | Bachler | Feb. 8, 1916 |

OTHER REFERENCES

Principles and Practice of Chromatography, Zechmeister et al., N. Y., 1941, pages 44, 45, 54, 55, 74–77.